Feb. 20, 1934.    C. A. WINSLOW    1,948,282
FLUID PURIFIER
Filed March 21, 1927

Inventor,
Charles A. Winslow
By Gillson Mann & Cox
his attys.

Patented Feb. 20, 1934

1,948,282

UNITED STATES PATENT OFFICE 1,948,282

FLUID PURIFIER

Charles A. Winslow, Vallejo, Calif., assignor to Catherine B. Winslow, Oakland, Calif.

Application March 21, 1927. Serial No. 177,183

8 Claims. (Cl. 123—196)

The purpose of the present invention is to afford means whereby fluids and the like may be purified.

A further object of the invention relates to means for purifying fluid such as lubricating oil, etc. in combination with the operation of a hydrocarbon engine, such as lubricating systems where oil is continually used and purified during the operation of the engine.

A further object of the invention is to create a means for automatically purifying and filtering fluids such as lubricating oil and air during the operation of a hydrocarbon engine, wherein the oil is continuously used for lubrication in the engine during the process of refining and purifying, and the air is purified before entering the combustion chamber, by circulation through the invention where it is drawn thru an oil soaked filtering medium, and later centrifuged to prevent oil from being drawn with the air thru the device, this centrifugal action on the air while allowing diluents in the lubricating oil in the forms of fuel, water etc. to be removed from the lubricating oil by evaporation, it prevents any form of liquid or solid from being carried with the air thru the device.

A further object of the invention is to afford a means to cause air or gases to be drawn thru a filtering medium saturated with flowing liquid fluids, and later centrifuged, said air or gases on its passage thru the filtering medium depositing solid impurities on said filtering medium, and absorbing by evaporation liquid impurities contained in the said flowing liquid fluids in the filtering medium.

A further object and advantage is the provision of a means in combination with the air or gas filtering means of causing the liquid fluid used in the said air or gas filtering means to be spread out over a large area and allowed to settle before being filtered.

A further object and advantage of the invention is the provision of a large area liquid filtering medium and settling chamber, which insures a very slow filtering rate and ample settling space from which sediment may be readily drained, said slow filtering rate is insured first, by the proportion of the area of the filtering element to the amount of liquid admitted to the device by the adjustable regulating screw at the liquid inlet, and second by an over flow above the top of the filtering element which prevents excess pressure thereon.

A further object and advantage of the invention is a fire screen over the carburetor inlet, when used in combination with a hydrocarbon engine which prevents all fire hazard, that may be caused by back firing of the engine.

A further object and advantage of the invention is the provision of a means of causing the impurities lodged on the filtering element, to be dislodged by a pulsating or reverse motion of the fluids being filtered, during operation of the invention, and caused by the pulsation of the air stream thru the device when used in combination with a hydrocarbon engine, air-compressor etc.

A still further object and advantage in addition to those above mentioned is a means of causing impurities collected on the liquid filtering element to be dislodged, and concentrated in the bottom of the sediment sump contained in the device.

Other objects and advantages will be apparent and suggest themselves as the nature of the invention is understood.

While the drawing illustrates an embodiment of the invention it is to be understood that in adapting the same to meet different conditions and requirements, various changes in the form, proportion, and minor details of construction may be resorted to without departing from the spirit of the invention.

Therefore I do not wish to limit myself to the form shown which is only a simple example of the application of combining scientific principles of liquid purification into a compact, efficient, and automatic means of filtering, aerating, and separating foreign substances or impurities from fluids while said fluids are in circulation and passing through the device.

Referring to the accompanying drawing, forming a part of the application:

Figure 1 is a vertical, sectional view of the invention and illustrates a form of the invention adaptable to use on hydrocarbon engines, air-compressors and the like where a predetermined amount of lubricating oil from the lubricating system washes down an air filtering means conveying impurities deposited on the filtering means by said air into the lower sludge chamber, the lubricating oil being first settled and then filtered by a second filtering means before its return to the source of supply, and a means of automatically removing impurities collected on the liquid filtering element and concentrating same in lower sludge chamber or sump where they may be readily drained.

Figure 2:
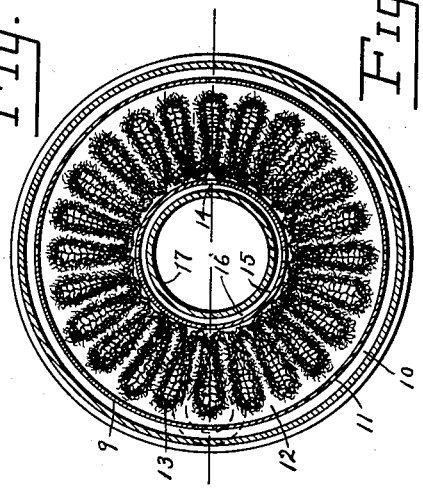
Figure 2 is a horizontal sectional view taken on the line A—A of Figure 1 looking in the direction indicated by arrows and illustrates a section of the air or gas filtering element contained in the invention.
Figure 3:
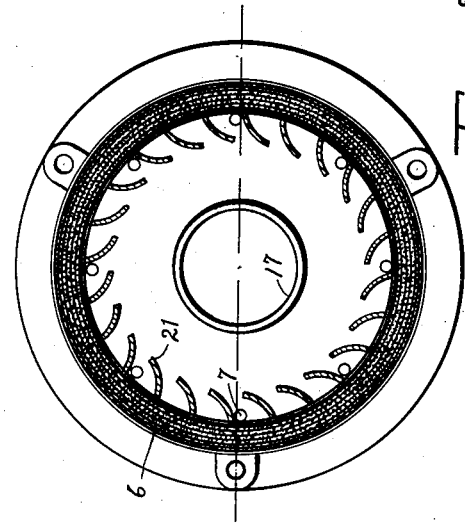
Figure 3 is a horizontal sectional view of Figure 1 taken on the line B—B looking in the direction indicated by arrows and illustrates a section of liquid settling chamber and filtering element contained in the invention.
Figure 1:
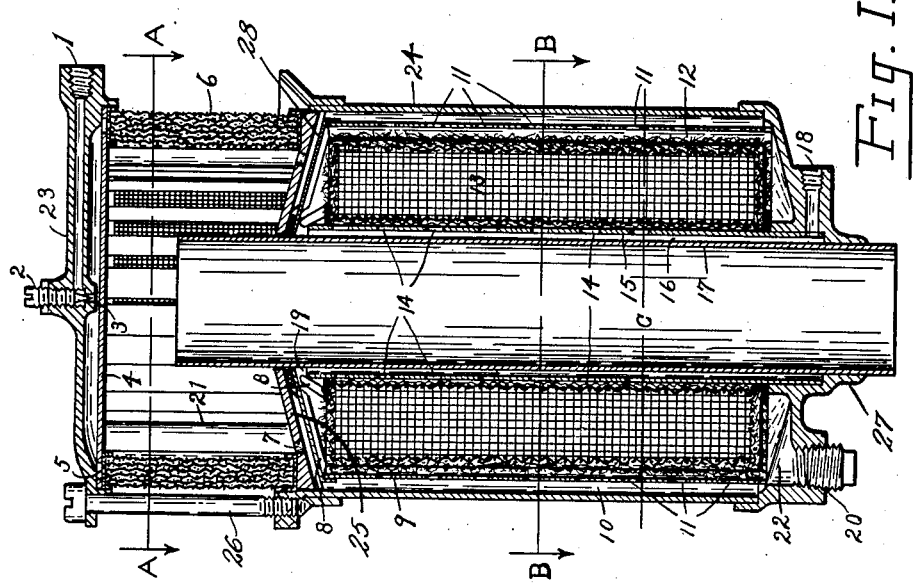

Corresponding and like parts are referred to in the following description and designated in the several views of the drawing by like reference characters. The device comprises an upper section or air filter assembly and a lower section or oil filter assembly. The upper section comprises a conical shaped base member 25 and a cap member 23 between which is mounted the air filtering member or medium 6. The cap member is dome-shaped and a distributer plate 4 is interposed between the filter element 6 the cap 23. The filtering medium 6 is preferably made of wire cloth, each second layer being cut on the bias and the cloth rolled into a hollow cylinder, as shown in Figs. 1 and 2. This filter material offers a very tortuous but free passage to incoming air and forms a very effective and efficient means for arresting foreign matter contained in the air. Suitable means are provided for centrifuging the oil laden air after it passes through the filtering member 6. Any suitable mechanism may be employed for this purpose.

In the form of the construction shown, a plurality of louvres 21 curved in cross-section are arranged within the cylindrical filter member 6 and adjacent thereto. These louvres are arranged at an angle to the radius of the cylinder so that air entering the cylinder through the filter material will be given a rotary movement about the axis of the cylinder. These louvres and the filter material are secured in position by clamping the same between the base member 25 and the distributer plate 4 by the bolts 26, one of which is shown in Fig. 1. The base member 25 is provided with openings 7 for permitting oil to pass downwardly therethrough, as will presently appear.

The cap member 23 is provided with an intake passage 1 which is adapted to be connected with the discharge side of the oil pump of the lubricating system of the engine. The intake passage terminates in an orifice 3 and a screw 2 is provided for controlling the amount of oil passing through said orifice. The distributer member 4 is provided with openings 5 directly above the filtering medium 6 whereby oil supplied through the passage 1 will be distributed to the filtering medium through the openings 5.

The lower section comprises a base 27 through which extends the pipe 17 which is adapted to be connected to the intake passage of the carburetor of an internal combustion engine. The pipe 17 passes upwardly axially into the cylindrical filtering medium 6. This lower section comprises a cylindrical wall 24 closed at its upper end by the member 25. Within this casing are two tubular members 9 and 15 which are arranged concentric with the pipe 17 and are spaced from each other and from the pipe 17 and cylindrical wall 24. The tubular member 9 is provided with a plurality of openings 11 and the tubular member 15 with openings 14. Arranged between the tubular members 9 and 15 is an oil filtering medium 13 which is arranged in loops in order to increase the length of the same, as shown in Fig. 2. A distributing member, or plate 28, which is conical in form, is attached to the tube 9 at its upper end and is provided with passages or channels 8 for conducting oil flowing onto said plate to the space between the tubular member 9 and the wall 24 of the casing.

The base member 27 is provided with an oil outlet or passage 18 which is in communication with the space between the pipe 17 and the inner tube 15 for conducting the oil passing through the filter into the lubricating system of the engine.

An variable amount of oil is allowed to enter the device through passage, 1 the amount being regulated by screw valve 2 and passing down thru orifice 3 to distributor plate 4 thence down through a plurality of orifices 5 in outer edge of plate 4 to upper edge of air filtering medium 6.

As the foreign particles of matter are arrested by contact with the oily air filtering medium 6 they are enveloped by the oil and carried down by gravity to the lower extremities of the air filtering medium 6 thence downwardly thru a plurality of orifices 7, and thru the passages 8 at top of distributer member 9 which causes the oil to be spread out on a large area allowing heavy particles of impurities to settle in settling chamber 10 at the bottom of the oil filter. The settled oil then flows inwardly thru a plurality of orifices 11 in the tube 9 into filtering chamber 12 and thru oil filtering medium 13, thence thru a plurality of orifices 14 in outer tube 15 thence downwardly thru space 16 formed between the larger perforated tube 15 and the smaller air outlet tube 17 to clean oil outlet 18 at the bottom of the device, which is preferably connected to the crankcase of a hydrocarbon engine air-compressor etc. above the oil level in same, or can be used to lubricate parts before returning to its source.

Outlet orifices 14 are arranged to prevent the contents of the filtering and settling chamber from being drained below the line C thru clean oil outlet 18.

An overflow 19 which is in effect a shunt leading directly to the outlet passage 18, is provided at top of tube 15 which prevents an excess of oil from overflowing out thru the air cleaner compartment and also allows only a certain pressure to be exerted against the filtering element 13.

The high oil level in the device during operation will be dependent upon the viscosity, temperature etc. of the oil used and also the cleanliness of the filtering element 13, and will vary from the low level line C to the overflow level at 19.

From the above it will be understood that during operation the oil level will be high and between periods of operation the oil level will be low.

Owing to this fact, foreign matter, impurities etc. collected on the filtering element 13 is caused to slide down the face of the element after each stop and gradually be concentrated in the sludge chamber 22 where they may be readily drained thru drain 20.

The air passage thru the invention is as follows, air is drawn thru tube 17 which is attached to the intake passage of the carburetor, by the engine, etc. and causes a slight depression within the air filtering element 6, air from the outside flows inwardly thru the oil soaked element depositing its impurities as previously described. During the passage of the air over the large exposed area of the oil flowing down thru the element 6, lighter fractions of dilution in the forms of fuel, water and the acid contained therein are evaporated by the inrushing air and carried with the air to the combustion chamber of the motor and used as fuel.

After the air passes the air filtering element 6 it is caused to rotate by the blades or louvers 21 which prevents by centrifugal force any heavy matter, as oil globules or oily dust being drawn into the outlet tube 17.

Upper air cleaner compartment is connected to lower oil filtering compartment through orifice 7, passage 10, orifice 11 and passage 12, as previously described and as pistons on the engine on which the device is employed cause pulsation when drawing in air, the element 13 is affected by a difference of pressures occurring between the top of the pistons and the crankcase of said engine thru outlet passage 18.

This pulsating or reciprocating motion of the oil being filtered causes the impurities stopped by the element 13 to be dislodged from the face of the element and it falls by gravity to the sump 22, as previously described. This feature constituting a self cleaning oil filtering means.

After long periods of operation or during overhaul periods of the engine to which the device may be attached, should it be desirable to renew the filtering element or for thorough cleaning of the apparatus, the device can be readily disassembled by simply removing the screws 30 from the cap member 23, which permits the withdrawal of the parts, 4, 6, 21, 9 and 13 from casing 24.

I am aware that prior to my invention fluid purifiers have been designed, incorporating the features of air cleaners, oil filters and dilution removers, and therefore do not claim such a combination broadly.

What I claim is:

1. A fluid purifier comprising a casing having inlet and outlet passages for liquids and gases, a filtering element through which gas is adapted to pass, means for delivering oil to said filtering element for removing the impurities from the gas passing through the filtering element and causing an evaporation of the fluid impurities from the oil, a series of louvres located within the compass of the filtering element to cause the gas to assume a high velocity rotary movement, thereby separating said oil and gas.

2. In a fluid purifier the combination with a casing having inlet and outlet passages for liquids and gases, a filter located near one end of said casing, means for delivering oil to said filter, said filter and oil removing the impurities from the air or gas passing therethrough and through the casing, and thereby causing an evaporation of the fluid impurities from the oil, a settling chamber located adjacent said filter for receiving the oil delivered therefrom, an oil filtering chamber located adjacent the settling chamber and having communication therewith for delivery of oil from the settling chamber, hollow filtering means located in the filtering chamber for removing the impurities from said oil, said filtering means comprising a filter mass, and means for causing differences in pressure existing in the casing to cause different levels to be assumed by the oil in said filter chamber thereby causing accumulations on said filter mass to be washed down into the settling chamber by the changing level of said oil.

3. In a continuous flow oil filter device, a series of concentric partitions separating dirty oil, filter, and clean oil compartments, a vertical filter in the filter compartment, a dirt sump below the filter compartment, a series of vertically disposed orifices in said partitions allowing oil to flow therethrough, a passage for conducting oil to said dirty oil compartment, whereby a variable rate of delivery of oil to said filter, and a variable rate of withdrawal of oil from the filter, is accomplished during the operation of said engine, whereby the level of the oil standing against the surface of said filter will be caused to change in the normal operation of the device when used on an internal combustion engine and in changing dislodge the sediment from the surface of said filter.

4. A filter device, comprising a hollow filter member, filter material carried by said member and adapted to be oiled for removing dust and other foreign matter from air passing through said filter material, and means within said filter member for causing a rotation of said air after it passes through said material for removing by centrifugal action particles of foreign matter picked up by said air in its passage through said material.

5. A filter device comprising a filter member, filter material carried by said member, means for oiling said material for removing dust and other foreign matter from air passing through said filter material, and means surrounded by said material for causing rotation of the air after it passes through said material for removing by centrifugal action oil carried by said air in its passage through said filter device.

6. A filter device comprising a filter member, means for oiling said member for removing foreign matter from air caused to move through said filter material, means for causing removal of the oil carried over by the air from said filter member on its passage through said device and means for filtering said oil through which the filter oil is discharged from said device.

7. A filter device comprising a filter member, means for oiling said member whereby foreign matter is removed from oil passing through said filter member, means for causing rotation of said air after it passes through said filter member for removing oil particles therefrom, means for filtering said oil and a passage through which the filtered oil is discharged from said device.

8. A device for removing foreign matter from the air and for purifying the oil employed in said device, comprising an air filter member, conduits adapted to supply oil to said filter member for wetting the same, means for causing the removal of free particles of oil from the air after it passes through said filter, an oil filter comprising filter material and means whereby the oil after wetting said air filter member will be caused to flow through said filter material for removing the impurities therefrom.

CHARLES A. WINSLOW.

CERTIFICATE OF CORRECTION.

Patent No. 1,948,282.  February 20, 1934.

CHARLES A. WINSLOW.

It is hereby certified that error appears in the printed specification of the above numbered patent requiring correction as follows: Page 3, line 47, claim 1, after the word "gas" and before the period at the end of the claim insert, , and means for separating the impurities from the lubricating oil; and that the said Letters Patent should be read with this correction therein that the same may conform to the record of the case in the Patent Office.

Signed and sealed this 3rd day of April, A. D. 1934.

F. M. Hopkins (Seal)  Acting Commissioner of Patents.